United States Patent [19]

Klobenzer et al.

[11] Patent Number: 4,686,049
[45] Date of Patent: Aug. 11, 1987

[54] METHOD AND APPARATUS FOR REPROCESSING AQUEOUS, OILY AND GREASY CLEANING SOLUTIONS

[75] Inventors: Heinz Klobenzer, Filderstadt; Peter Hösel, Pforzheim, both of Fed. Rep. of Germany

[73] Assignee: Dürr GmbH, Fed. Rep. of Germany

[21] Appl. No.: 843,128

[22] Filed: Mar. 24, 1986

[30] Foreign Application Priority Data

Apr. 3, 1985 [DE] Fed. Rep. of Germany ....... 3512207

[51] Int. Cl.$^4$ .............................................. B01D 3/02
[52] U.S. Cl. .................................. 210/774; 196/134; 202/180; 202/235; 210/175
[58] Field of Search ............... 202/204, 235, 180, 195; 210/175, 664, 187, 774, 180; 196/104, 105, 110, 114, 115, 118, 119, 120, 133, 155, 102, 98, 99, 134

[56] References Cited

U.S. PATENT DOCUMENTS 515,889 3/1894 Todd .................................. 202/204

Primary Examiner—Frank Sever
Attorney, Agent, or Firm—Pahl, Lorusso & Loud

[57] ABSTRACT

In a method for reprocessing aqueous, oily and greasy cleaning solutions by separating oil and grease out of the solution in an oil separator, a mixture of oil, grease and cleaning solution separated in the oil separator is subjected to vaporization for the purpose of thickening it, the hot water vapor thereby resulting is used to heat the oil separator and the condensed water resulting from the vapor is fed back to the cleaning solution for its regeneration. An apparatus for performing this method is characterized in that the oil separator is enclosed by an outer casing, in the bottom region of which the separated cleaning solution containing oil and grease is collected and vaporized, the hot vapor thereby resulting being utilized to heat the cleaning fluid in the oil separator. A condensate collecting tray is provided between the bottom region of the outer casing and a bottom wall of the oil separator and condensed water flows from this tray back into the cleaning solution.

8 Claims, 1 Drawing Figure

U.S. Patent  Aug. 11, 1987  4,686,049
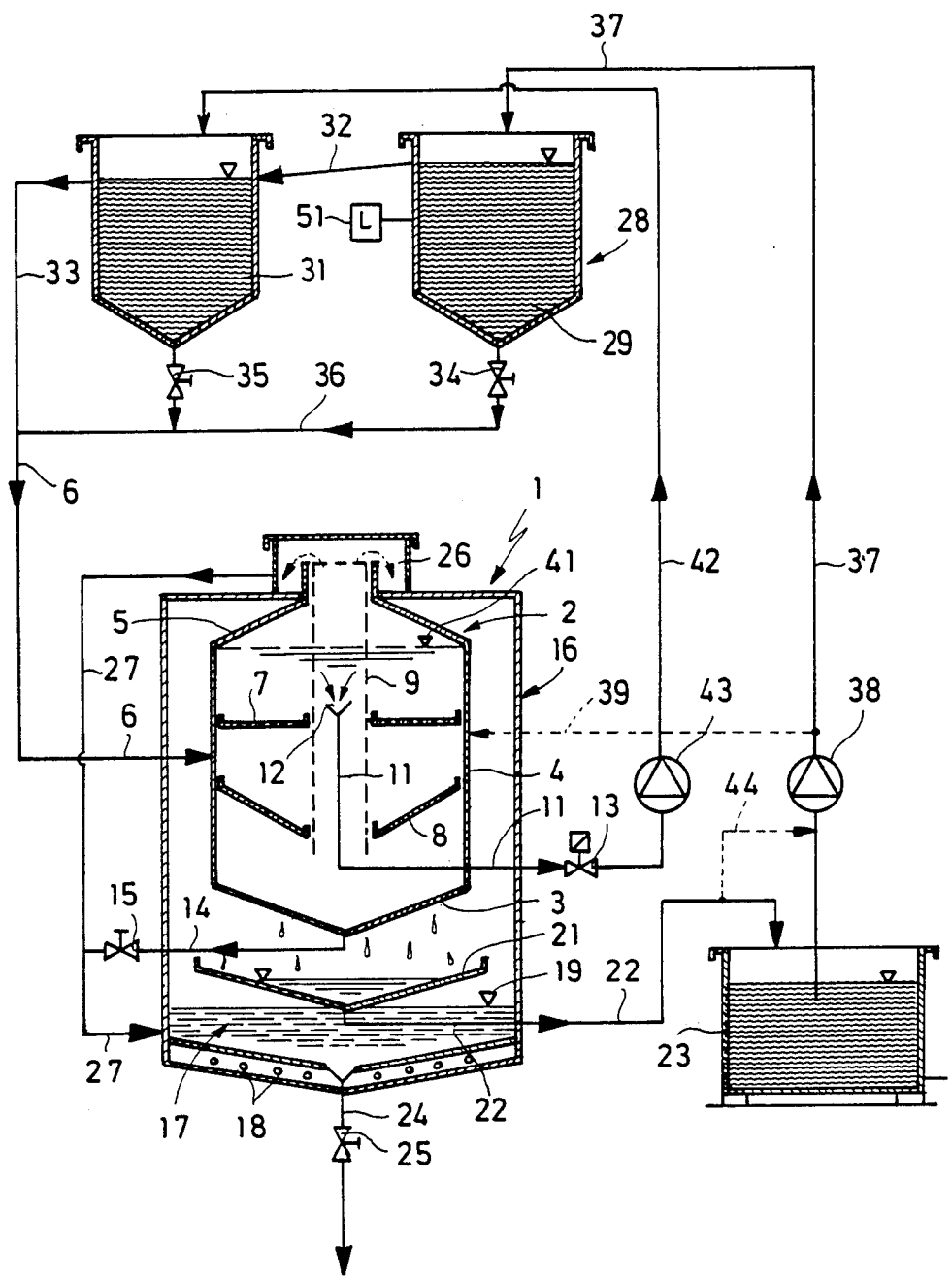

METHOD AND APPARATUS FOR REPROCESSING AQUEOUS, OILY AND GREASY CLEANING SOLUTIONS

The invention relates to a method for reprocessing aqueous, oily and greasy cleaning solutions by separating oil and grease out of the solution in an oil separator. In addition, the invention relates to apparatus for performing such a method.

It is known to use oil separators, centrifuges ultrafiltering systems and the like for reprocessing aqueous, oily and greasy cleaning solutions. All these systems have the disadvantage that they are either very large and complicated, produce a considerable amount of waste water or require a great deal of energy. Oil separators must be heated for warming the cleaning fluids to be treated and therefore additional energy is required.

The object of the invention is to eliminate the above deficiencies and to provide a method of the type in question, as well as design an apparatus of the type in question, such that continuous treatment is possible, a considerable amount of energy is hereby saved and no waste water results during operation.

According to the invention, the object is accomplished for a method of the type in question in that a mixture of oil, grease and cleaning solution separated in the oil separator is subjected to vaporization for the purpose of thickening, that the hot water vapor thereby resulting is used to heat the oil separator, and that the condensed water resulting from the vapor is fed back to the cleaning solution for the purpose of its regeneration.

In this way, the water vapor which results in any case during thickening of the oily and greasy impurities phase is advantageously used to directly heat the oil separator and, thereby, to heat the cleaning solution to operating temperature. It is not necessary to use ultrasonic and other apparatus or additional energy for heating the oil separator and the cleaning solution. The fact that the condensate resulting during vaporization is fed back to the cleaning solution guarantees that operation is practically free of waste water. The inventive method therefore operates in a manner which is ecologically beneficial and also saves energy.

An apparatus for carrying out the inventive method is characterized in that the oil separator is enclosed by an outer casing and in a bottom region hereof the separated cleaning solution containing oil and grease is collected and vaporized, the vapor thereby resulting being in direct heat exchange contact with a wall of the oil separator, and that a condensate collecting tray is arranged between the bottom region of the outer casing and a bottom wall of the oil separator, the condensed water flowing out of the tray and back into the cleaning solution.

BRIEF DESCRIPTION OF THE DRAWING

The following description of preferred embodiments of the invention serves to explain this invention in greater detail, in conjunction with the attached drawing which is a schematic illustration of an oil separator cooperating with a cleaning apparatus.

An oil separator 1 comprises an inner tank 2 with a bottom wall 3, a casing 4 which is, for example, cylindrical and a conical top end wall 5. The cleaning solution, from which oil and grease are to be removed, is introduced via a conduit 6 which enters the inner tank at approximately half way down the side of the casing 4.

A fluid-permeable screen 7 is arranged in the customary manner in the interior of the tank 2 and prevents coarse dirt particles from ascending through the tank. A trough-like annular wall 8 which has the shape of a cone is arranged at a distance beneath the screen 7 to prevent the dirt phase, which settles beneath this wall 8 on the bottom wall 3, from swirling upwards into the space located above the annular wall 8. A perforated tube 9 extends vertically through the center of the tank 2 and defines a stabilizing zone, into which the processed cleaning solution passes from the space between the screen 7 and the wall 8. A conduit 11 having a funnel-shaped inlet opening 12 is arranged in the interior of the perforated tube 9 and extends parallel hereto. It is guided out of the oil separator 1 to the outside and leads to a solenoid valve 13. A further conduit 14 leads from the center of the slightly conical bottom wall 3 and out of the oil separator 1 to a manually operated valve 15.

As illustrated in the drawing, the inner tank 2 is entirely enclosed by an outer casing 16 which is penetrated by the conduits 6, 11 and 14 already mentioned. The casing 16 extends at a distance from the outer side of the inner tank 2 such that a space is left between the casing 16 and this outer side. A mixture of oil, grease, dirt and cleaning solution is collected (in a manner to be described later) in a bottom region 17 of the outer casing. For the purpose of thickening, this mixture may be heated by a heating device 18 of any kind to the vaporization temperature of the water contained in the cleaning fluid. The position of the surface of this mixture in the bottom region 17 is indicated in the drawing by a small triangle 19. A tray 21 for collecting condensate is arranged in the interior of the casing 16 above the fluid level indicated by the triangle 19 and below the inner tank 2. A conduit 22 leads from the condensate collecting tray 21 to the outside, to a condensate collecting tank 23.

In order to remove waste from the oil separator the bottom wall of the outer casing 16 is connected to a conduit 24 with a valve 25. The thickened mixture of dirt, oil, grease and cleaning fluid may be drawn off through this conduit 24.

The top end wall 5 of the inner tank 2 leads into an overflow vessel 26, from which an overflow conduit 27 leads to the bottom region 17 of the oil separator. The conduit 14 mentioned earlier, which leads away from the bottom plate 3 of the inner tank 2, is connected to the oil overflow conduit 27 via the valve 15 and so the dirt phase settling on the bottom wall 3 can, if required, be conveyed to the bottom region 17 of the outer casing 16 as well.

The oil separator 1 described above is operated in the following manner. The soiled cleaning solution which contains oil and grease and is introduced via the conduit 6 forms a water phase in the central region of the inner tank 2 between screen 7 and annular wall 8. Coarse dirt particles will sink downwards out of this water phase due to the force of gravity and settle as dirt phase on the base plate 3. Specifically lighter components, i.e. in particular oil and grease, swim upwards out of the water phase and form an "oil phase" consisting substantially of oil and grease. During continuous operation, this oil phase continually overflows into the overflow vessel 26 and is then passed to the bottom region 17 of the outer casing 16 via the conduit 27. A zone of relatively pure cleaning solution, specified as the "clean phase", results between the oil phase and the water phase above the screen 7. The oil and dirt phases reaching the bottom region 17 are vaporized and the resulting water vapor passes the condensate collecting tray 21 and reaches the space between the inner tank 2 and the outer casing 16. The hot water vapor is hereby in direct heat exchange contact with the outer wall of the inner tank 2, which brings about the actual separation of oil and grease, and therefore serves to heat the phases inside the tank 2 and, in particular, to heat the cleaning solution which subsequently leaves the clean phase via the conduit 11 and is passed on for reuse. The condensed water forming from the vapor drops onto the condensate collecting tray 21 and is passed to the condensate collecting tank 23 via the conduit 22.

In the embodiment illustrated in the drawing, the cleaning solution to be reprocessed originates from a cleaning apparatus 28 which operates preferably continuously and is illustrated in the drawing above the oil separator 1. The cleaning apparatus comprises, for example, a rinsing device 29 and a washing device 31. Articles soiled with oil and grease are washed and subsequently rinsed in the customary manner in these devices. The rinsing device is connected to the washing device 31, also in a manner known per se, via a conduit 32 so that cleaning solution can be reused for washing after the rinsing process. The heavily soiled cleaning solution is passed from the washing device 31 via a connecting conduit 33 to the conduit 6 which leads to the oil separator 1. The rinsing device 29 and washing device 31 may be emptied, as required, via normally closed, manually operated valves 34, 35 into a conduit 36 which also opens into the conduit 6.

As illustrated, condensed water may be fed by means of a pump 38 from the collecting tank 23 into the rinsing device 29 via a conduit 37. It is then possible to regenerate the cleaning solution continuously with fresh water.

In another embodiment of the invention, the cleaning solution is not regenerated and diluted via the conduit 37 but via the conduit 39 which is shown as a broken line. The conduit 39 branches off the conduit 37 downstream of the pump 38 and leads directly into the water phase between screen 7 and annular plate 8.

During operation of the oil separator 1, an additional fluid phase is formed above the screen 7 and below the phase overflowing into the overflow vessel 26. This phase consists essentially of cleaning solution with dissolved components, i.e. in particular oil, grease and cleaning agent. The specifically lighter, oily and greasy phase swims on top of this relatively clean phase and overflows into the overflow vessel 26. The boundary layer between the two aforementioned phases is indicated in the drawing by the small triangle 41. The inlet opening 12 to the conduit 11, which is connected downstream of the valve 13 to a conduit 42 leading to the washing device 31, is located in this phase of cleaning solution with dissolved components which is already relatively clean. This means that relatively clean cleaning solution, from which coarse impurities such as oil and grease have been separated, can be supplied directly to the cleaning system by means of a pump 43 provided in the conduit 42.

The condensate collecting tank 23 is not absolutely necessary for operation of the system described above. It could also be bypassed by an additional conduit 44 which is illustrated in the drawing as a broken line and leads from the conduit 22 to the pump 38. It is also possible, in this way, for condensed water to be supplied continuously for diluting the cleaning solution, both via the conduit 37 and the conduit 39.

The hot water vapor formed in the bottom region 17 may be used not only for heating the inner tank 2 of the oil separator but also for heating the rinsing and washing devices 29, 31. For this purpose, a vapor conduit may, for example, lead from the outer casing 16 to the rinsing and washing devices for heating the cleaning solution. In the embodiment illustrated, the hot water vapor is in heat exchange contact with the walls of the inner tank 2 for the purpose of heating its contents. In another embodiment of the invention, it is possible to have at least part of the hot water vapor fed directly into the cleaning solution for the purpose of simultaneously heating and diluting it. This may take place, for example, in the water phase in the inner tank 2 of the oil separator 1 or also in the rinsing and washing devices 29, 31. If feeding of the vapor is to a great extent quantitative, the condensate collecting tank 21 may possibly be dispensed with, together with any feeding back of the condensed water into the cleaning solution.

The fact that the gravity oil separator 1 tapers upwards in the shape of a cone (top end wall 5) facilitates separation of the oil phase without this being mixed with the water phase. The conical design of the annular wall 8 helps to avoid any swirling of specifically heavier impurities under the influence of the cleaning solution flowing into the separator 1. The prevention of swirling is also aided by the conical design of the floor 3.

A device 51 for measuring the electrical conductivity of the cleaning solution in the rinsing device 29 is associated with this rinsing device. On the basis of the values measured, the amount of return flow through the conduit 32 may be automatically regulated by a valve which is not illustrated.

We claim:

1. Method of reprocessing aqueous, oily and greasy cleaning solutions during the cleaning of industrial parts by separating oil and grease out of the solution in a gravity oil separator comprising superposed dirt, water and oil phases, said method comprising the steps of vaporizing said solution, heating said oil separator with hot water vapor produced by said vaporizing, for the purpose of thickening, the separated mixture of oil, grease and cleaning solution, eliminating waste water by feeding the condensed water resulting from said vaporizing back to the cleaning solution for the purpose of its regeneration.

2. Method as defined in claim 1 wherein said condensed water is fed back to the cleaning solution in said oil separator.

3. Apparatus for reprocessing aqueous, oily and greasy cleaning solutions during the cleaning of industrial parts comprising:

means for vaporizing the oily and greasy cleaning solution so that the vaporized solution may be used to heat the oil separator, said vaporizing means including an inner tank enclosed by an outer casing of the oil separator and a bottom region also enclosed by said outer casing for collecting and vaporizing the separated cleaning solution containing oil and grease, means for bring the hot vapor into direct heat exchange contact with the walls of said inner tank, means for regenerating the cleaning solution including a condensate collecting tray arranged between said bottom region of said outer casing and a bottom wall of said inner tank, means for eliminating waste water by allowing the condensed water to flow out of said tray and back into said cleaning solution.

4. Apparatus as defined in claim 3 further comprising a condensate collecting tank for collecting the condensed water prior to said condensed water flowing back into said cleaning solution.

5. Apparatus as defined in claim 3 wherein a top end wall of said inner tank tapers conically upward.

6. Apparatus as defined in claim 3 further comprising a cone shaped annular wall in said inner tank for preventing any swirling of dirt particles.

7. Apparatus as defined in claim 3 wherein the floor of said inner tank is conically shaped.

8. Apparatus as defined in claim 3 further comprising a measuring device for measuring the conductivity of the cleaning solution, in particular in the region of a rinsing device, for the purpose of controlling the amount of return flow from said device into a washing device accordingly.

* * * * *